United States Patent
Kensel et al.

(10) Patent No.: US 10,650,327 B2
(45) Date of Patent: May 12, 2020

(54) ADAPTIVE CONTENT GENERATION AND DISSEMINATION SYSTEM (ACGDS)

(71) Applicant: Primavera Financial Inc., Newport Beach, CA (US)

(72) Inventors: Brendon Clark Kensel, Corona del Mar, CA (US); Stanley Keith VanBibber, Irvine, CA (US)

(73) Assignee: Primavera Financial Inc., Newport Beach, CA (US)

( * ) Notice: Subject to any disclaimer, the term of this patent is extended or adjusted under 35 U.S.C. 154(b) by 207 days.

(21) Appl. No.: 15/268,621

(22) Filed: Sep. 18, 2016

(65) Prior Publication Data

US 2017/0083626 A1    Mar. 23, 2017

Related U.S. Application Data (60) Provisional application No. 62/220,888, filed on Sep. 18, 2015.

(51) Int. Cl.
| | |
|---|---|
| *G06N 20/00* | (2019.01) |
| *G06N 5/04* | (2006.01) |
| *G06F 16/958* | (2019.01) |
| *G06F 16/957* | (2019.01) |

(52) U.S. Cl.
CPC ......... *G06N 20/00* (2019.01); *G06F 16/9577* (2019.01); *G06F 16/972* (2019.01); *G06N 5/04* (2013.01)

(58) Field of Classification Search
CPC .. G06N 99/005; G06N 5/04; G06F 17/30893; G06F 17/30905
USPC .................................. 707/722, 732–734
See application file for complete search history.

(56) References Cited

U.S. PATENT DOCUMENTS

| | | | |
|---|---|---|---|
| 7,313,621 B2 | 12/2007 | Gudorf et al. | |
| 7,472,089 B2 | 12/2008 | Hu et al. | |
| 7,958,066 B2 | 6/2011 | Pinckney et al. | |
| 8,364,579 B2 | 1/2013 | Hu et al. | |
| 8,838,513 B2 | 9/2014 | Sudharsan | |
| 9,087,332 B2 | 7/2015 | Bagherjeiran et al. | |
| 2002/0040339 A1 | 4/2002 | Dhar | |
| 2011/0313884 A1 | 12/2011 | Eze | |
| 2012/0149342 A1* | 6/2012 | Cohen | H04L 12/587 455/412.2 |
| 2013/0339217 A1 | 12/2013 | Breslow et al. | |

(Continued)

*Primary Examiner* — Hares Jami
(74) *Attorney, Agent, or Firm* — Henry J. Cittone; Cittone Demers & Arneri LLP (57) ABSTRACT

The present invention provides an adaptive content generation and dissemination system for generating adaptive content based on a personalized user profile and presenting adaptive content to the user. The system comprises an adaptive and predictive synchronous ecosystem that presents multiple methods for assembling and/or providing content to user terminals, such as, by way of example, content for instruction, training, knowledge transfer, and on-demand help. The present invention utilizes key human sensory learning mechanisms including graphics, video, audio, an/or interactive sessions, to enable different types of learners to efficiently and rapidly consume and thoroughly comprehend complex concepts and detailed information associated with transactions associated with service provider.

12 Claims, 9 Drawing Sheets

(56) References Cited

U.S. PATENT DOCUMENTS

| | | | |
|---|---|---|---|
| 2015/0161649 A1* | 6/2015 | Eggleston | G06Q 30/0236 705/14.36 |
| 2016/0232244 A1* | 8/2016 | Liu | G06F 17/30867 |
| 2017/0041413 A1* | 2/2017 | Chandhok | H04L 67/26 |

* cited by examiner

| UI & DB Field | Complete Profile | Partial Profile | Note |
|---|---|---|---|
| Start | 03/01/2015 13:23:04 | 03/01/2015 13:23:04 | |
| Submitted By | Borrower | | |
| Gender | F | | |
| DOB | 02/01/1990 | | |
| Age | 25 | | |
| Generation | Millennial | | |
| City | Alhambra | | |
| State | CA | | |
| Postal Code | 91801 | | |
| Email | @gmail.com | @gmail.com | |
| Mobile | Y | | |
| Employed | Y | | |
| Employment Type | Full-Time | | |
| Employment Length | 2 years | | |
| Monthly Income | 2600 | | |
| Preferred Communication | Text | | |
| Residence Type | Rent | | |
| Monthly Housing Payment | 500 | | |
| DTI | 26% | | |
| No. Open Trades | 2 | | |
| Late Payment Flag | N | | |
| Probability of Default | 13% | | |
| Insured | Y | Y | |
| Down Payment | 250 | 250 | |
| FICO | 699 | | |
| Loan Amount | 2500 | 2500 | |
| Qualified Options | String of Options | String of Options | |
| Selected Option | MP18 | MP18 | |
| Qualified Offers | String of Offers | | |
| Selected Offer | EP12 | | |
| Variance Selected Option to Offer | +$123/mo | | |
| Recalculated | N | | Did user recalculate new loan amount |
| IP Time Zone | Baja California | Baja California | IP Time Zone |
| Connection Type | DSL | DSL | Connection Type |
| Average Income | $49,764 | $49,764 | Average Income |
| IP Address | 192.168.0.0 | 192.168.0.0 | |

ADAPTIVE CONTENT GENERATION AND DISSEMINATION SYSTEM (ACGDS)

CROSS-REFERENCE TO RELATED APPLICATION

This application claims the benefit of U.S. Provisional Patent Application No. 62/220,888 filed Sep. 18, 2015, the disclosures of which are hereby incorporated by reference in their entirety.

FIELD OF THE INVENTION

The present invention relates to an adaptive generation and dissemination system. More specifically, the present invention provides an adaptive and predictive synchronous ecosystem that presents multiple methods for assembling and/or providing content to user terminals by utilizing learning mechanisms.

BACKGROUND

The Internet has had a profound effect on the service sector industry, dramatically changing the cost and capabilities for marketing, distributing and servicing products and enabling new types of products and services to be developed. The internet has played a major role in various segments of the service industry such as in the healthcare industry, financial service industry, legal sector, educational service industry, social service industry etc.

Most of the service sector industries are required to convey information to the user/consumer at every stage of the sales and/or contracting process. This requires a dedicated, trained, competent agent or broker to facilitate the process fairly, consistently, and in compliance with applicable legal and ethical standards. The agent or broker provides the information/content to the consumer and ensures he/she understands the requirements and formalities at every stage of the process.

In order to effectively and efficiently inform and guide consumers, the service provider must recruit, hire, train, and retain a staff of brokers or agents. The brokers and agents rely upon multiple paper forms and lengthy documents to convey the information/content and complete tasks such as acquiring demographic information, verifying the accuracy of the information, evaluating the information, and offering to sell related services to the customer. The agent role is not limited to collecting the user information; additionally, the agent has to guide the user throughout the process including, providing the content to the user, helping the user to understand the legal and regulatory formalities, and understanding the user's own requirements and commitments. This makes the process tedious and requires involvement of agents at every stage.

In view of the aforesaid limitations in the existing systems for guiding, educating, and disclosing sales and contractual information, there is a need for a computerized system that reduces or eliminates the heavy reliance upon human agents and brokers by utilizing key electronic human-sensory learning mechanisms, including graphics, video, audio and/or interactive sessions, to enable different types of learners to efficiently, effectively, and rapidly consume and comprehend concepts and detailed information.

SUMMARY

In a first aspect of the present invention, a computer-implemented method for providing adaptively generated content to a user is provided. The method comprising: establishing a session by a server of a service provider with a user device; collecting, by the server, one or more of user information by taking data from a plurality of resources and creating a profile of the user; applying a predictive model to search for similar profiles of other users matching with the profile of the user and determining the type of content objects or learning techniques to be provided for display on the user device; processing, by the server, rules associated with the profile of the user and generating a personalized presentation layer and communicating it to the user device. One or more information related to a user is collected from one or more resources, including form filled data, social network databases, insurance databases, credit service databases, government databases, the device identification parameters, human computer interaction types, different time durations associated with the different stages of the process and geolocation and GPS information. The type of content objects may comprise content for instruction, training, knowledge transfer, and on-demand help; and the learning techniques are comprised of graphics, video, audio, and/or interactive sessions to enable the user to efficiently and rapidly consume and comprehend complex concepts and contractual transactions. The predictive model utilizes machine learning algorithms for creating the user profile, and determining the content objects or learning techniques, and recording the deviation of the user from the content objects or learning techniques presented by the predictive model.

In a second aspect of the present invention, a system for generating adaptive content and presenting it to a user is provided. The system is comprised of: a database to store profiles of a plurality of users; a processor for instructing a set of codes for establishing communication with a user device operated by a user through a platform; a personalization module for collecting information of the user from a plurality of resources and creating a user profile; a rules engine having a set of programmed instructions to determine the applicability of a rule for the user profile; a targeting module for searching similar profiles to the user profile in the database and applying a set of rules in the rules engine to determine the type of content objects or learning techniques to be provided for display to the user; a presentation manager to present the determined content objects or learning techniques to the user. The platform on the user device may be comprised of a web browser, a mobile application, a gaming console, or a virtual reality headset. The rules engine is triggered by an action of the user which comprises one or more of e-commerce activity, an application or a lead generation. The targeting engine and the personalization engine utilizes predictive modeling for refining the user profile and searching for similar profiles of other users in the database. The plurality of resources that can be used to collect user information is comprised of filled-forms of the user, social network databases, insurance databases, credit service databases, government databases, the device identification parameters, human computer interaction types, different time durations associated with the different stages of the process and geolocation and GPS information. The learning techniques may be comprised of graphics, video, audio, and/or interactive sessions to enable the user to efficiently and rapidly consume and comprehend complex concepts and contractual transactions, wherein the type of content objects may comprise of content for instruction, training, knowledge transfer, and on-demand help.

BRIEF DESCRIPTION OF DRAWINGS

The preferred embodiment of the invention will hereinafter be described in conjunction with the appended drawings provided to illustrate and not to limit the scope of the invention, wherein like designation denotes like element and in which.

DETAILED DESCRIPTION

In the following detailed description of embodiments of the invention, numerous specific details are set forth in order to provide a thorough understanding of the embodiment of invention. However, it will be obvious to a person skilled in art that the embodiments of invention may be practiced with or without these specific details. In other instances well known methods, procedures and components have not been described in details so as not to unnecessarily obscure aspects of the embodiments of the invention.

Furthermore, it will be clear that the invention is not limited to these embodiments only. Numerous modifications, changes, variations, substitutions and equivalents will be apparent to those skilled in the art, without parting from the spirit and scope of the invention.

In an embodiment of the present invention, an adaptive content generation and dissemination system (ACGDS) is provided. The system comprises an adaptive and predictive synchronous ecosystem and provides multiple methods for assembling and/or providing content to user terminals, such as, by way of example, content for instruction, training, knowledge transfer, and on-demand help. The system utilizes key human sensory learning mechanisms including graphics, video, audio, an/or interactive sessions, to enable different types of learners to efficiently and rapidly consume and thoroughly comprehend complex concepts and detailed information, such as those that may be associated with transactions such as loans for medical procedures or care.

The architecture of adaptive content generation and dissemination system enables the assembly and provision of content objects using a robust data analytics stack, to aggregate and interpret data on user behavior using machine learning techniques, to deliver content that progressively adapts to the user's understanding of the content and preferred learning style, and that optionally does not provide extraneous content objects that are not related to the user's interests or needs, to thereby reduce the amount of processing power and network bandwidth that would otherwise be needed to provide such content objects to the user's terminal. The system allows data collection from forms such as insurance applications, user behavior recordings and predictive modeling techniques that reduces processing time significantly. The predictive modeling technique reduces user critical thinking time and the amount of computer processing and network bandwidth needed by selecting and presenting most-opted, selected or relevant selections from user-driven algorithms. The direct integration of and interaction between the user and the content may improve efficiency, accuracy, economic benefit and consumer satisfaction, for e.g. utilizing synchronous data dissemination.

The adaptive content generation and dissemination system implements machine learning to reduce processing time and to deliver content that progressively adapts to the user's understanding of the content and preferred learning style. The machine learning absorbs the data attributes from a data warehouse/analytics engine to create a unique profile per user. The machine learning automatically and dynamically generates algorithms based at least in part on the amount of profiles captured along with the amount of data stored for each profile. The generated algorithms are dynamic in nature and are in constantly changing state. Machine learning has components that aid in developing the algorithms that are absorbed by a rules engine. The rules engine is optionally a dynamically programmed environment. The rules engine may perform language parsing, and rules evaluation to determine if a rule can fire, and may include a search engine configured to efficiently identify the relevant rules. Profile development and definition is utilized for the predictive modeling.

Predictive Modeling triggers the delivery of personalized solutions (e.g. in order of determined relevance). The predictive modeling is further refined and enhanced as more data and interaction profiling becomes available. The predictive modeling process may comprise searching for similar profiles determined by patterns and algorithms that in turn, develop algorithms that are refined in substantially real time. This creates an efficient experience leading the user to best opportunity for educational consumption too.

The adaptive content generation and dissemination system (ACGDS) provided in the present invention can adaptively educate consumers on products and services being considered for purchase; educate and inform consumers on any agreements and contracts associated with the purchase of a product or service using adaptive content and the like. The ACGDS uses multiple forms of adaptive content and presentation methods to customize the information according to the type of product or service being purchased; the consumer's pace of learning; the channel through which the product or service is being purchased; legal compliance requirements and the dealer or vendor's risk profile.

The adaptive content generation and dissemination system can be accessed from any digital platform including, but not limited to, a web browser, a mobile application, a game console, and a virtual reality headset. The system adaptively generates content for one or more of the scenarios: product, service or options available for selection or purchase; ancillary product, service or options available for selection or purchase based on prior selections; and sales and purchase processes, including contracts and purchase agreements.

The components of the adaptive content generation and dissemination system may include a rules engine, a targeting and personalization engine, a content and document management system, a presentation manager, and an analytics engine. The system integrates these technologies into a unique and comprehensive adaptive content generation and dissemination platform to best match a consumer's learning style. The platform may use one or more of the following learning styles such as visual, auditory and kinesthetic. The visual learning style may include graphs, charts, pictures, and seeing information. The auditory learning style includes content related to hearing and speaking. The kinesthetic learning style may involve interaction with content. The system matches these learning styles by presenting adaptive content to the user in form of combination of one or more of following: graphs, charts, pictures, audio, video, text, social interactions, live chat, live text, advertising, or interactive exchanges. The adaptive content generation and dissemination system enables seamless integration and presentation of dynamically generated media and content, and faster presentation of optimized content that is targeted and personalized to the user. The ACGDS enables consumers to learn about products or services by offering consumers with interactive branched scenarios, self-paced content, interaction through video, chat or text, opportunities to share through social networks and gain feedback, demonstrations through interactive content, ability to repeat any part of the content, option to take action including, but not limited to, making a purchase, completing an application, or completing a lead-generation form and the like.

In an embodiment of the present invention, the adaptive content generation and dissemination system can be either hosted in cloud, in server of a service provider, in the web server or locally hosted on the client device. In one of the implementation, different components of the adaptive content generation and dissemination system are present at different locations.

Figure 1:
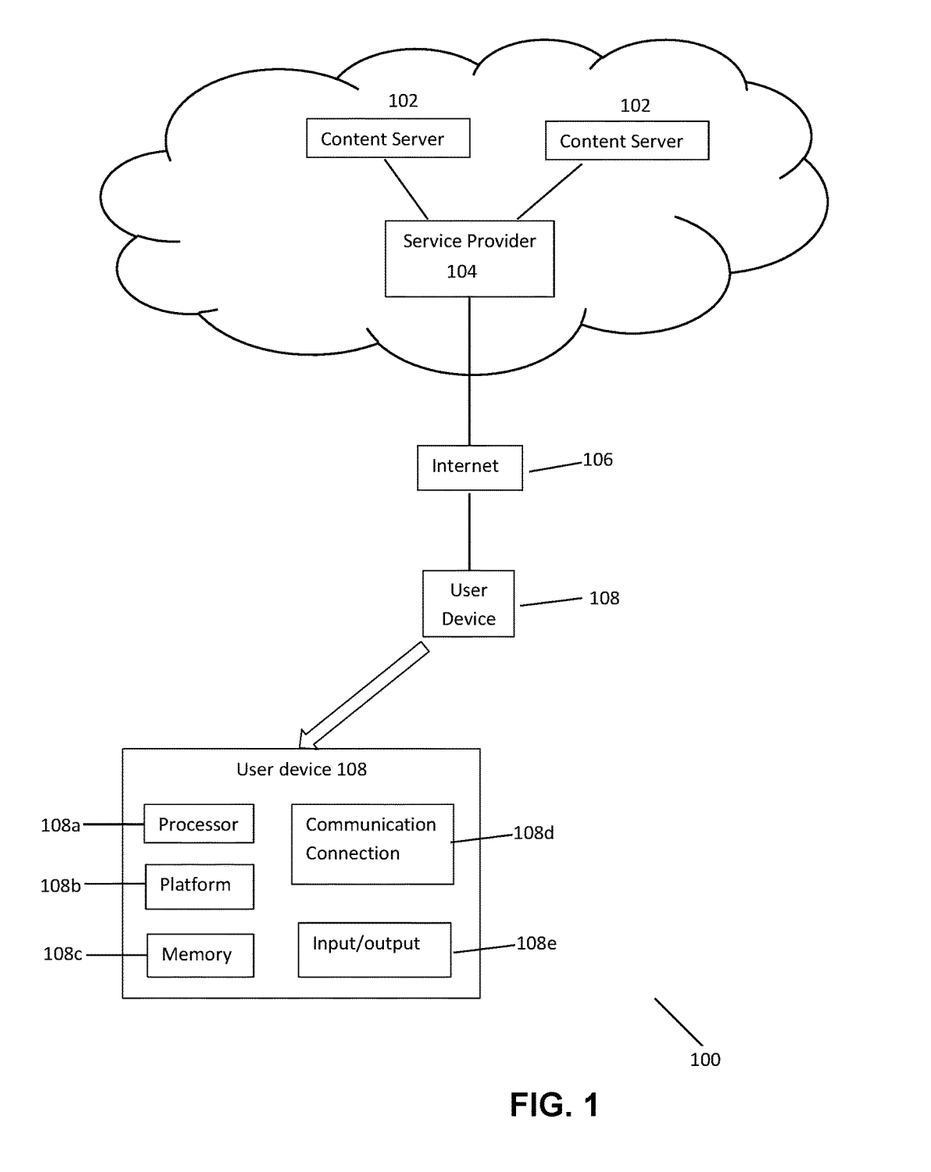
FIG. 1 illustrates network architecture showing components used in adaptive content generation and dissemination system in accordance with an embodiment of the present invention.

FIG. 1 illustrates network architecture showing components used in adaptive content generation and dissemination system in accordance with an embodiment of the present invention. The network 100 comprises a user device 108 connected through internet 106 to a service provider 104 and a content server 102 of the service provider 104. The user device 108 comprises one or more processor 108a, a platform (user interface) 108b, a memory 108c, a communication connection 108d and input/output interface 108e. The user device 108 can be a laptop, a smart phone, a PDA, a gaming console and the like. One or more processors 108a may be a central processing unit, a microprocessor, an application specific processor, a general purpose processor, or any device that executes instructions. The user device 108 can utilize memory in the form of any computer-readable storage medium, such as hard drives, CDs, DVDs, flash memory, RAM, ROM and the like. The platforms 108b described herein may include a web browser, a mobile application, a game console, a virtual reality headset and the like.

The user device 108 communicates with the service provider 104 through the internet 106. The service provider 104 communicates with the content server 102 in order to provide assistance to the user for his opted service. The service provider 102 may be a provider of healthcare services, financial services, legal services, educational services, social services and the like.

The user device 108 may comprise an input/output interface such as a display, a projector, a touch panel, a scrolling device, a button, a switch, a motion sensor, an audio sensor, a pressure sensor, a thermal sensor, etc. to present information to the user. For an instance, the input interface may be configured to accept user provided information, such as user feedback.

The communication connection 108d may include a network for facilitating communications among the user device 108, the service provider 104 and the content server 102.

The network 100 may include, but is not limited to, a wireless or wired links like Wi-Fi, LANs, WANs, Bluetooth, mobile telephone networks, near-field communication (NFC) and the like.

Figure 2:
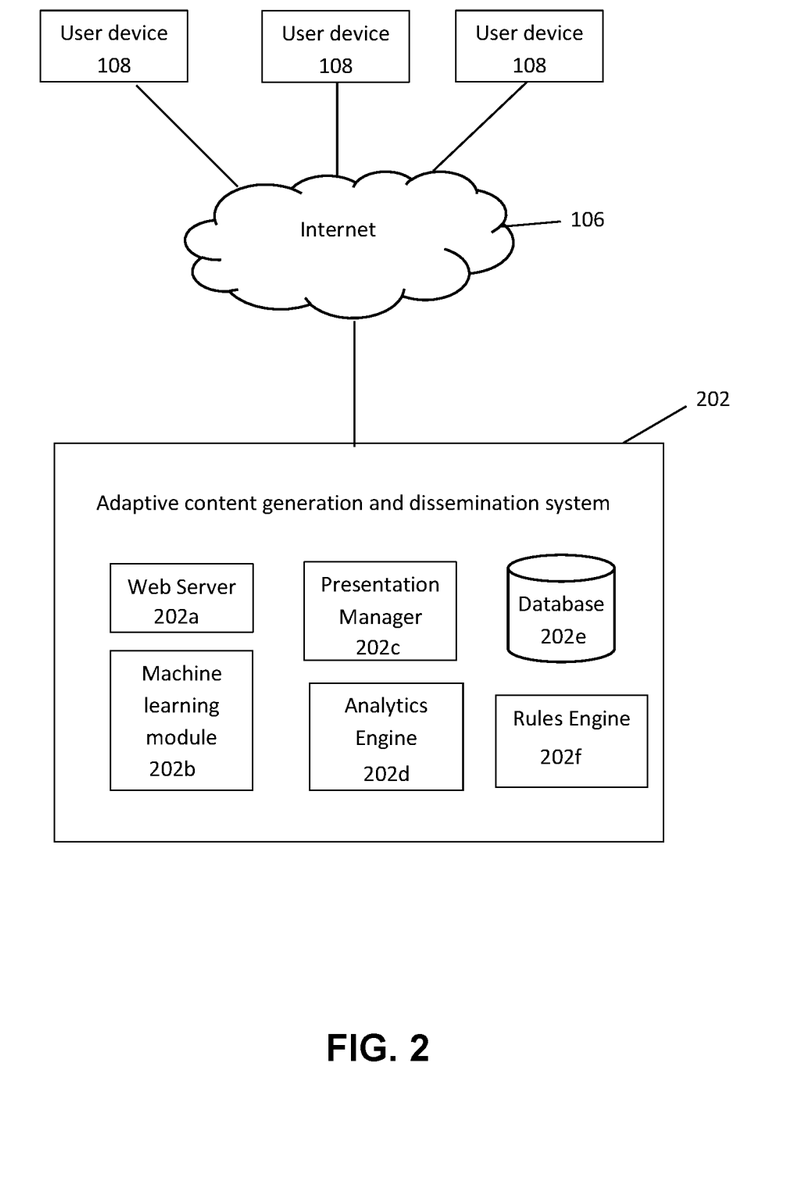
FIG. 2 represents a network architecture showing communication between one or more user devices and an adaptive content generation and dissemination system in accordance with an embodiment of the present invention.

FIG. 2 represents a network architecture showing communication between one or more user devices and an adaptive content generation and dissemination system in accordance with an embodiment of the present invention. The user device 108 communicates with the adaptive content generation and dissemination system 202 through internet 106. The user device 108, comprises one or more processor, platform, memory, communication connection and input/output interface. The user device 108 can be a laptop, a smart phone, a PDA, a game console and the like. Processors may be a central processing unit, a microprocessor, an application specific processor, a general purpose processor, or any device that executes instructions. The user device 108 can utilize memory in the form of any computer-readable storage medium, such as hard drives, CDs, DVDs, flash memory, RAM, ROM and the like.

The Adaptive content generation and dissemination system 202 comprises a web server 202a, an analytics engine 202d, a machine learning module 202b, a rules engine 202f, a presentation manager 202c and a database 202e. When the user device 108 communicates with the adaptive content generation and dissemination system 202 through the web server 202a running on devices like personal computers, laptops, PDAs tablets, mobile phones and the like, then the information provided by the user is mined and processed by the analytics engine 202d. The analytics engine 202d utilizes data mining and extraction of hidden predictive information from large databases in order to make proactive and knowledge-driven decisions. Data collected and mined from various resources such as user provided data, data from additional resources (e.g., social network databases, insurance databases, credit service databases, governmental databases, the device identification parameters, human computer interaction types, different time durations associated with the different stages of the process and geo-location & GPS information and the like) are used for recording the user behavior and predictive modeling to reduce processing time significantly. This type of machine learning module 202b reduces user critical thinking time and the amount of computer processing and network bandwidth needed by selecting and presenting most-opted, selected or relevant selections from user-driven algorithms. The algorithms that can be applied are linear regression, logistic regression, SVM, Naive Bayes, KNN, K-Means and the like. The analysis from the analytics engine 202d and the implementation of machine learning leads to user profile creation. The machine learning module 202b pushes one of the aforementioned algorithms along with the information related to user profile to the rules engine 202f, that decides the presentation manager 202c, where the rules engine 202f is optionally a dynamically programmed environment. The rules engine 202f may perform language parsing, and rules evaluation to determine if a rule can fire, and may include a search engine configured to efficiently identify the relevant rules. After utilization of rules in the rules engine 202f, the presentation manager 202c provides option to present the relevant information in visual, auditory, kinesthetic and the like forms. Visual objects can be, but not limited to, graphs, charts, pictures, and seeing information; auditory can be hearing and speaking and the like; and kinesthetic is interaction with the content.

Figure 3:
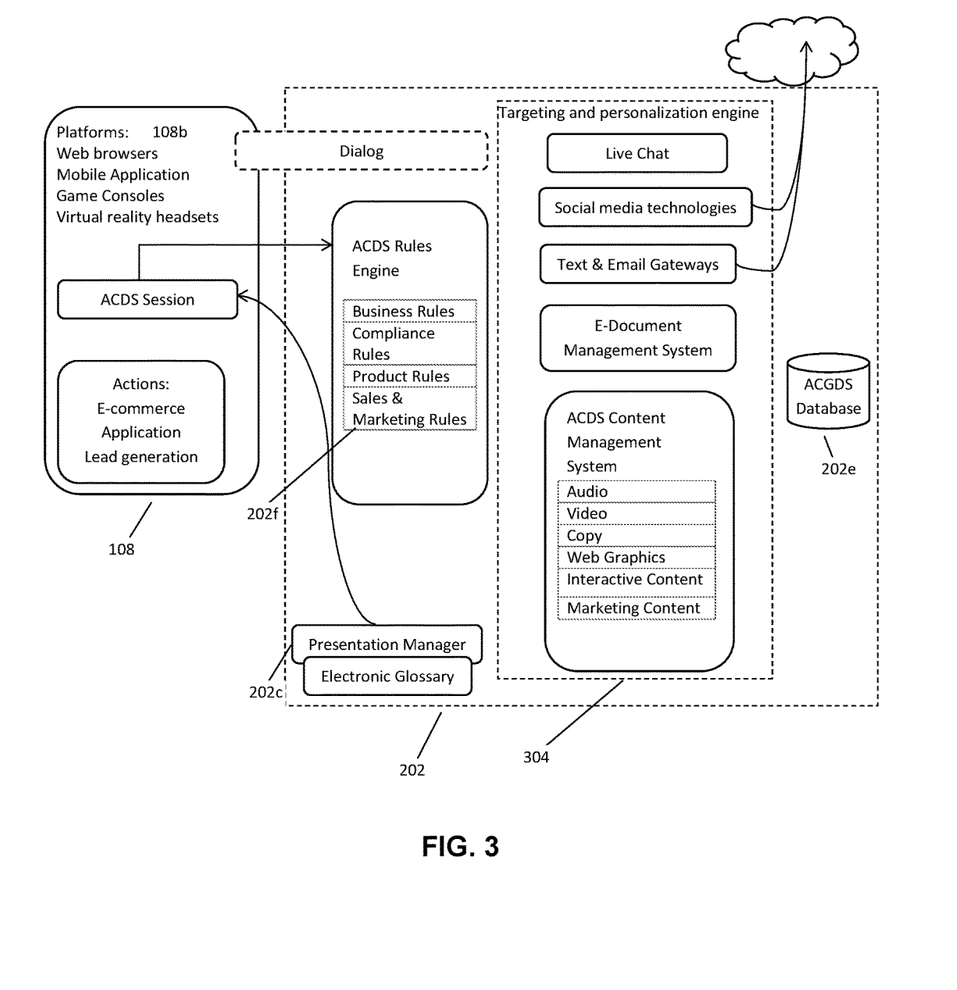
FIG. 3 illustrates a schematic architecture of integration of adaptive content dissemination system and a user in accordance with an embodiment of the present invention.

FIG. 3 illustrates a schematic architecture of integration of adaptive content dissemination system and a user in accordance with an embodiment of the present invention. The schematic shows integration between platforms used by user on the user device 108 and the adaptive content generation and dissemination system 202. The adaptive content generation and dissemination system 202 comprises a rules engine 202f, a presentation manager 202c, a targeting and personalization engine 304 and a database 202e. The user can use a variety of platforms 108b on the user device 108 to connect with the adaptive content dissemination system 202, which may include a web browser, a mobile application, a game console, a virtual reality headset and the like. A session is established between the user device and the adaptive content generation and dissemination system 202. The adaptive content dissemination system 202 is hosted by a service provider that wants to utilize the system for presenting multiple methods for assembling and/or providing content to user terminals, such as, by way of example, content for instruction, training, knowledge transfer, and on demand help.

When the user accesses the web page, an event or user action on the web page activates a trigger to the adaptive content generation and dissemination system 202. The action may vary depending on the industry segment to which the service provider belongs to, which may include the action related to an e-commerce activity, an application or a lead generation. The action initiated on the webpage of the service provider triggers the rules engine 202f present in the adaptive content dissemination system to execute the rules associated with the trigger. The rules engine 202f is a dynamically programmed environment having a set of instructions that need to be followed during a process. The rules engine 202f may utilizes business rules, compliance rules, product rules, sales and marketing rules and the like according to the activated trigger. The rules engine 202f may perform language parsing, and rules evaluation to determine if a rule can fire, and may include a search engine to efficiently identify the relevant rule.

The targeting and personalization engine 304 in the system then develops a profile of the user using predictive modelling. The step of profile development and definition may utilize one of various ways for generating the user profile. The targeting and personalization engine 304 may utilize data mined from the form data provided by or on behalf of a user, data from additional sources, such as social network databases, insurance databases, credit service databases, government databases which may store information on mortgages, liens, property ownership, etc. The targeting and personalization engine 304 may also take into consideration the device identification parameters (type of terminal the user is utilizing to access the system), human computer interaction types, different time durations associated with the different stages of the process and geo-location and GPS information (through a mobile app that provides the user's current and/or historic locations).

The targeting and personalization engine 304 targets and searches for similar profile as that of the user to best match the user's learning style. The learning style may be visual (visual objects such as graphs, charts, pictures, and seeing information), auditory (hearing and speaking), and kinesthetic (interaction with content). Depending on the specified threshold matching between the profiles, the content management system develops an algorithm for presentation of content to the user while reducing the amount of critical thinking required to make a selection. The content is delivered and the ACGDS session is managed by the presentation manager 202c. The presentation manager 202c contains an electronic glossary, where the electronic glossary hyperlinks key terms in the content to definitions. The adaptive content dissemination system depending on the matching of user profile with other users may use one or more of the aforesaid learning styles.

Figure 4:
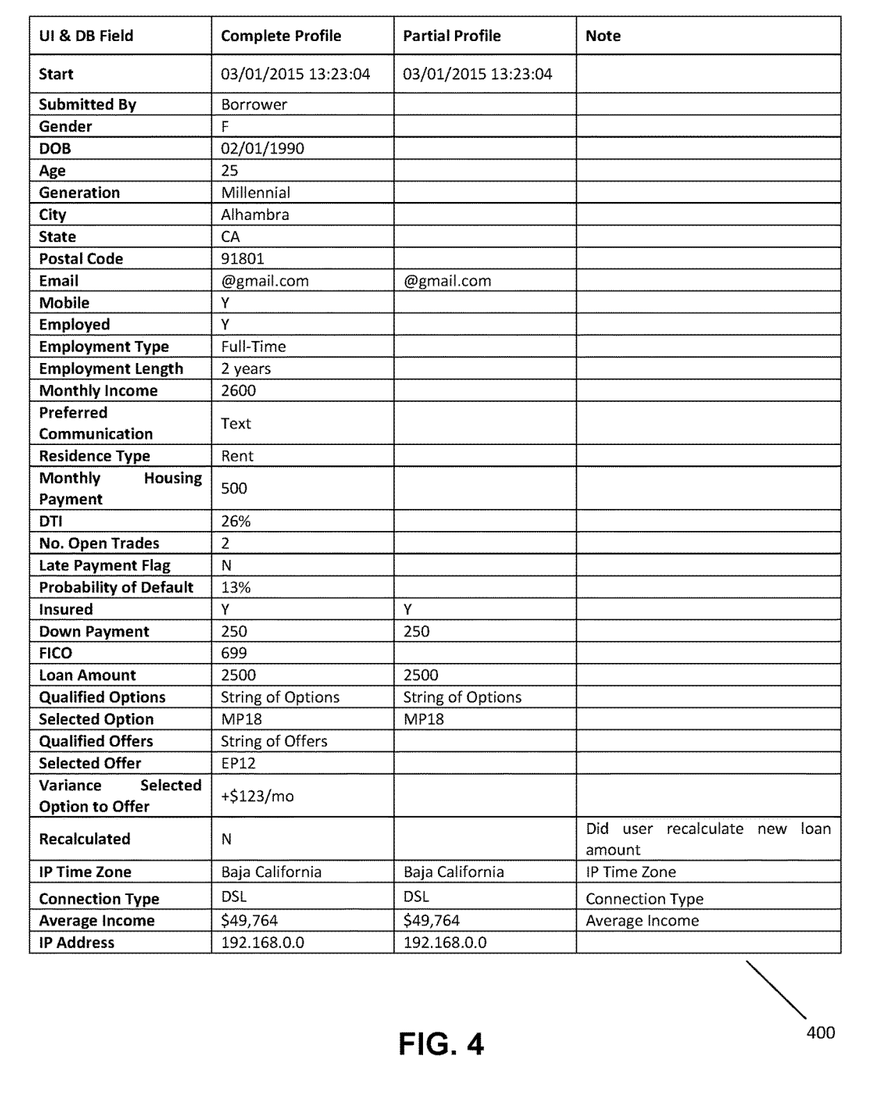
FIG. 4 shows a profile generated by the targeting and personalization engine in accordance with an embodiment of the present invention.

FIG. 4 shows a profile generated by the targeting and personalization engine in accordance with an embodiment of the present invention. FIG. 4 is an example of data mining for a user who is making an application for loan with the adaptive content dissemination system. The profile has fields from form data provided by the user and fields collected from additional resources. The additional resources may include social network databases, insurance databases, credit service databases, governmental databases (such as stored information on mortgages, liens, property ownership), device identification parameters, human computer interaction types, process start and end times, geo-location, and GPS information. Taken together the data collected via the user interface and the data collected through data mining forms the unique user profile that is employed by ACGDS to guide and direct the current user/consumer through the loan process. Notes can also be inserted into the profile by the adaptive content dissemination system.

Figure 5:
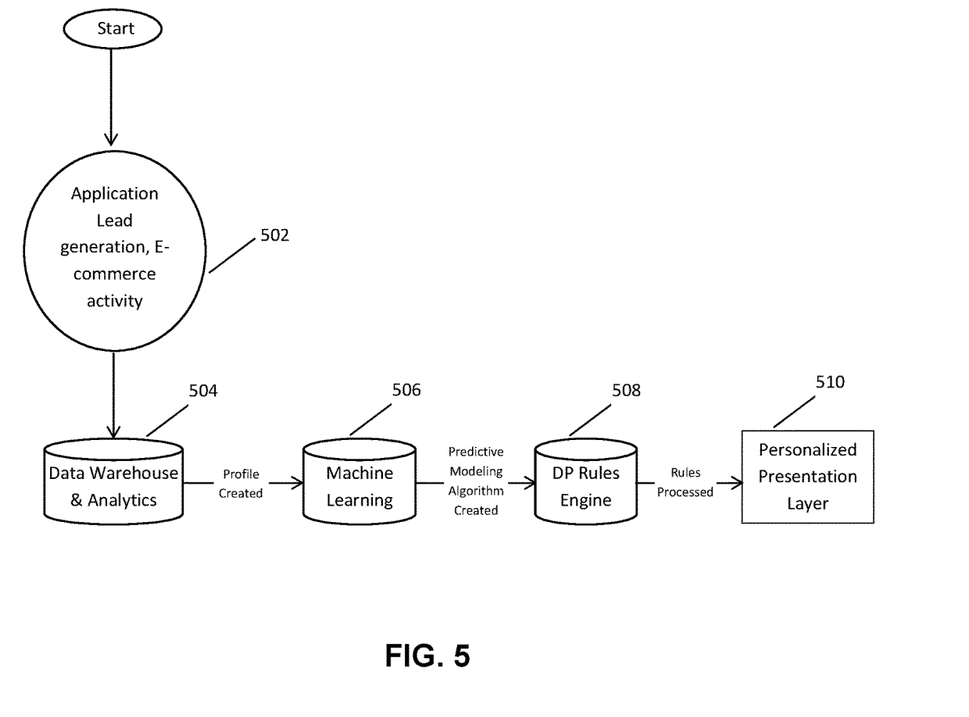
FIG. 5 illustrates a block diagram showing process flow of information in the adaptive content dissemination system in accordance with an embodiment of the present invention.

FIG. 5 illustrates a block diagram showing process flow of information in the adaptive content dissemination system in accordance with an embodiment of the present invention. The process is started when a user initiates an activity on the web page or server, which may be related to an application submission, lead generation or an e-commerce activity at step 502. The information filled in by the user is used to create a partial profile and the data warehouse, and the analytics perform data mining from additional resources to gather additional information of the user at step 504. The captured additional information is then used along with the partial profile to generate the complete profile of the user. After that at step 506, machine learning algorithms are applied on to the created profile which absorbs the data attributes from the data warehouse/analytics engine to create a unique profile of the user. Predictive modelling is applied by the machine learning module which involves searching for similar profiles determined by patterns and algorithms. At step 508, a rules engine is present that comprises set of instructions and rules for personalized solutions.

In other words, user information is mined in the data warehouse and analytics layer at step 504, processed in machine learning at step 506, which then pushes the algorithm to the rules engine at step 508 that along with decisions in the workflow of the adaptive content dissemination system, decides the presentation layer at step 510.

From the table shown in FIG. 4 it can be seen that the service seeking user is on a desktop at the time of the experience. The rules engine would take the predictive model information; run the rules on the device identification thus rending a desktop friendly list of adaptive learning options with the predictive results as their primary option followed by additional adaptive methods. The rules engine pulls personalized information from the user profile to include in the adaptive learning materials, such as first name and selected loan option or offer. This experience mitigates confusion by focusing on the user's selection only, while the personalization drives more engagement while reducing user anxiety.

In an exemplary embodiment of the present invention, the data mining, for the user seeking loan, shows that the user is millennial as shown in FIG. 4. The data warehouse and analytics engine in this example has determined that 87% of all millennial users have opted for video learning methods, 10% lean towards graphics and the remaining 3% have used audio. The adaptive content generation and dissemination system determines from such information that the content objects or learning techniques are to be provided for display on the user terminal in the following order: Video, Graphics and Audio. The remaining learning methods are optionally listed, and if the user deviates from the predictive model (e.g., by selecting one of the listed remaining learning methods), that deviation is recorded. The predictive model then takes an even further look at the user to identify patterns of similar users' profiles opting out of the suggested ordering of content objects, refines, stores the rules, and adjusts.

Figure 6:
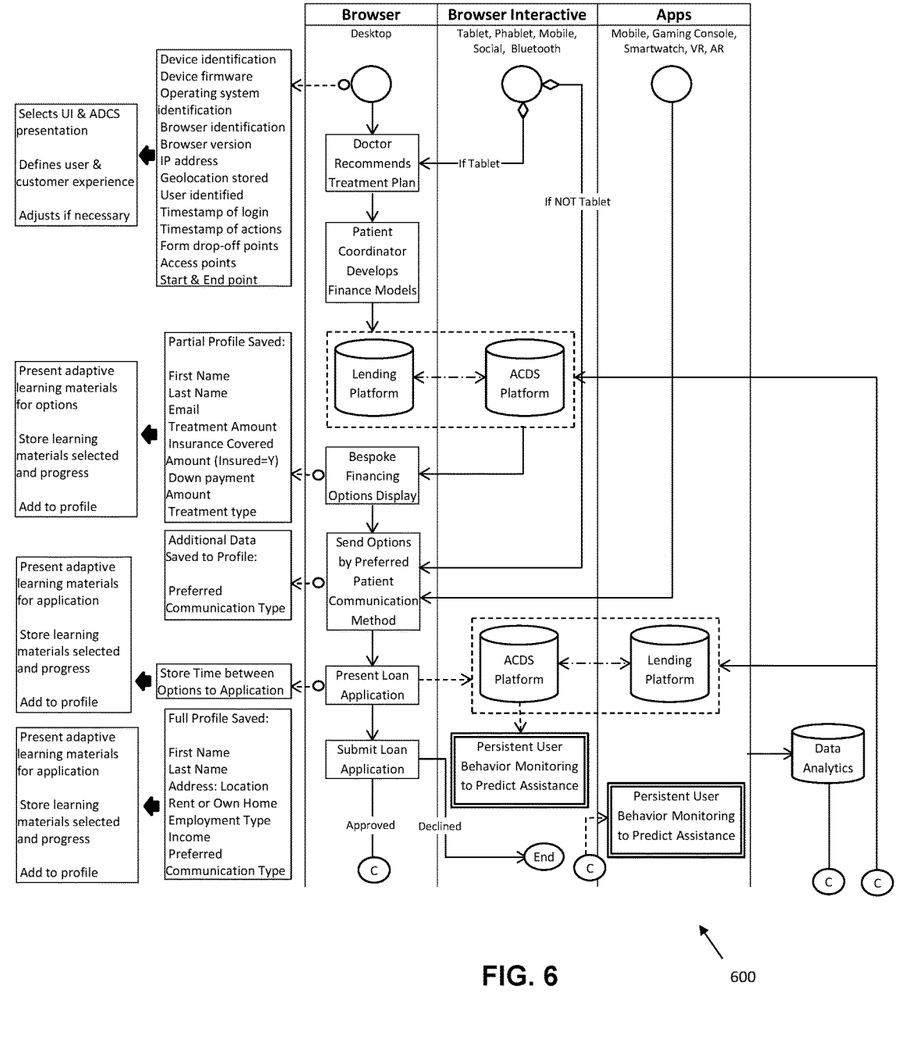
FIG. 6 illustrates the working of adaptive content dissemination system operated through different platform in accordance with an exemplary embodiment of the present invention.

FIG. 6 illustrates the working of adaptive content dissemination system operated through different platform in accordance with an exemplary embodiment of the present invention. The user makes an application on the adaptive content dissemination system for financing medical treatment cost using various platforms such as browser operated on a desktop, browser interactive used on tablet, phablet, mobile, social, Bluetooth and applications used on mobile, gaming console, smart watch, virtual reality headsets etc. Different platforms use different types of use case for opting medical treatment cost.

In case the patient tries to opt for medical treatment using desktop browser or tablet, the adaptive content generation and dissemination system (ACGDS) records patient provided data as well as the data from different sources. In case of desktop, the ACGDS records data, such as device identification, device firmware, operating system identification, browser identification, browser version, IP address, geo-location stored, and user identified timestamp of login, timestamp of actions, form drop-off points, access points, start and end point etc. Firstly, a doctor recommended treatment plan is viewed by the patient and a patient coordinator develops finance models for the medical treatment plan. The patient coordinator contacts a lending platform and the lending platform communicates with the ACGDS. After this communication, financing options for the patient is displayed. During this communication, a partial profile of the patient is saved. The partial profile field can be, but not limited to, first name, last name, email, treatment amount, insurance covered amount, down payment amount, and treatment type. Then, the financing options are sent to the patient by preferred communication method. The patient's preferred communication type is then saved to the patient's profile in the form of additional data. Now, the patient receives the loan application and submits it. When the patient submits the loan application, his complete profile is saved that comprises various fields like first name, last name, address (location), rent or own home, employment type, income, preferred communication type etc. After the loan approval, the patient can review all the loan offers. Here, some more data is saved to the profile, wherein the fields can be FICO, reported income, credit scoring model, credit model, residency behavior, credit history behavior etc. The patient selects the best suitable loan offer after his review. When the patient selects loan offer, corresponding data is stored to the ACGDS, where the stored data can be string of qualified offers, selected loan offers, placement of selected offer on page, time between offers presented and selection, selection changes and the like. After the selection of the loan offer, corresponding contract, disclosures and loan documents are generated. The ACGDS stores if loan documents are sent or completed in office and the time between selections to loan documents. All the loan documents and the legal documents are e-signed. The ACGDS stores where loan documents are signed, time between documents presentation and signature and number of attempts when loan documents were opened. The signed loan legal documents are sent to the lending platform and then the information is updated in the ACGDS. Now, the patient sets up automatic payment option for the payment against the funded loan. After loan funding, patient receives welcome kit. The ACGDS records and saves payment type selected, stores time between loan application to funding and stores the ready to fund loans which has been expired now.

If the patient is using some other browser interactive or application on devices such as tablet, mobile, social, Bluetooth, gaming console, smart-watch, virtual reality headsets and the like for opting the loan, then the patient receives financing options by preferred communication method. The patient's preferred communication type is saved to the patient's profile. When the patient receives the loan application e-form they complete the e-form on the device, and electronically submit it to the lender. When the patient submits the loan application, his/her profile is created and saved in the ACGDS; at that point the profile is comprised of fields such as first name, last name, address (location), rent or own home, employment type, income, preferred communication type, etc. During the loan approval process the lender receives additional information about the user from external data resources and that information is added to the patient's unique ACGDS profile; this information may include income, industry and proprietary credit scores, residency behavior and history, credit history behavior, etc. After loan approval by the lender, the patient will view the array of loan products and loan terms for which they qualify. The patient can review all the loan offers and learn about them under the assistance and guidance of the ACGDS. At each step of the patient's application and review of the loan offers the patient's user behavior data is saved to the profile; this data may include what offers the patient reviews, the frequency and order in which they review the offers, the amount of time spent reviewing each offer, and the level of detail the patient reviews about each offer. The patient selects the best suitable loan offer after his/her review. When the patient selects a loan offer, corresponding data is stored to the adaptive content dissemination system, where the stored data can be string of qualified offers, selected loan offers, placement of selected offer on page, time between offers presented and selection, selection changes and the like. After the selection of the loan offer the appropriate electronic loan documents are generated and transmitted to the patient device. The adaptive content dissemination system stores the patient's user behavior vis a vis the loan documents. This data may include the locations and devices the loan documents are reviewed on, the time the user stays on each page of the documents, the amount of assistance the patient requires to understand the loan terms and conditions, and the format of user assistance the user prefers (video, audio, or text). All the loan documents and the legal documents are e-signed. The adaptive content dissemination system stores where loan documents are signed, time between documents presentation and signature and number of attempts when loan documents were opened. The signed loan legal documents are sent to the lending platform and then the information is updated in the adaptive content dissemination system. In the final step of the lending process the patient sets up an automatic payment method for the loan. After the loan proceeds are disbursed, the user receives a welcome e-mail with information about his loan, payment schedule, and customer service contact. During the automatic payment setup and loan funding, the adaptive content dissemination system records and saves payment type selected, stores time between loan application to funding and stores expired ready to fund loans.

During each step, the lending platform and the adaptive content dissemination system communicates with each other and provides relevant information to the patient coordinator and the patient. The whole architecture enables the assembly and provision of content objects using a robust data analytics stack to aggregate and interpret data on user behavior or machine learning to deliver content that progressively adapts to the user's understanding of the content and preferred learning style and that optionally does not provide extraneous content objects that are not related to the user's interests or needs, to thereby reduce the amount of processing power and network bandwidth that would otherwise be needed to provide such content objects to the user's terminal. Machine Learning absorbs the data attributes from data analytics engine to create unique profile per user and to automatically and dynamically generate algorithms that may be in constant change, based at least in part on the amount of profiles captured along with the amount of data stored for each profile. Machine Learning has components that aid in developing the algorithms.

Figure 7:
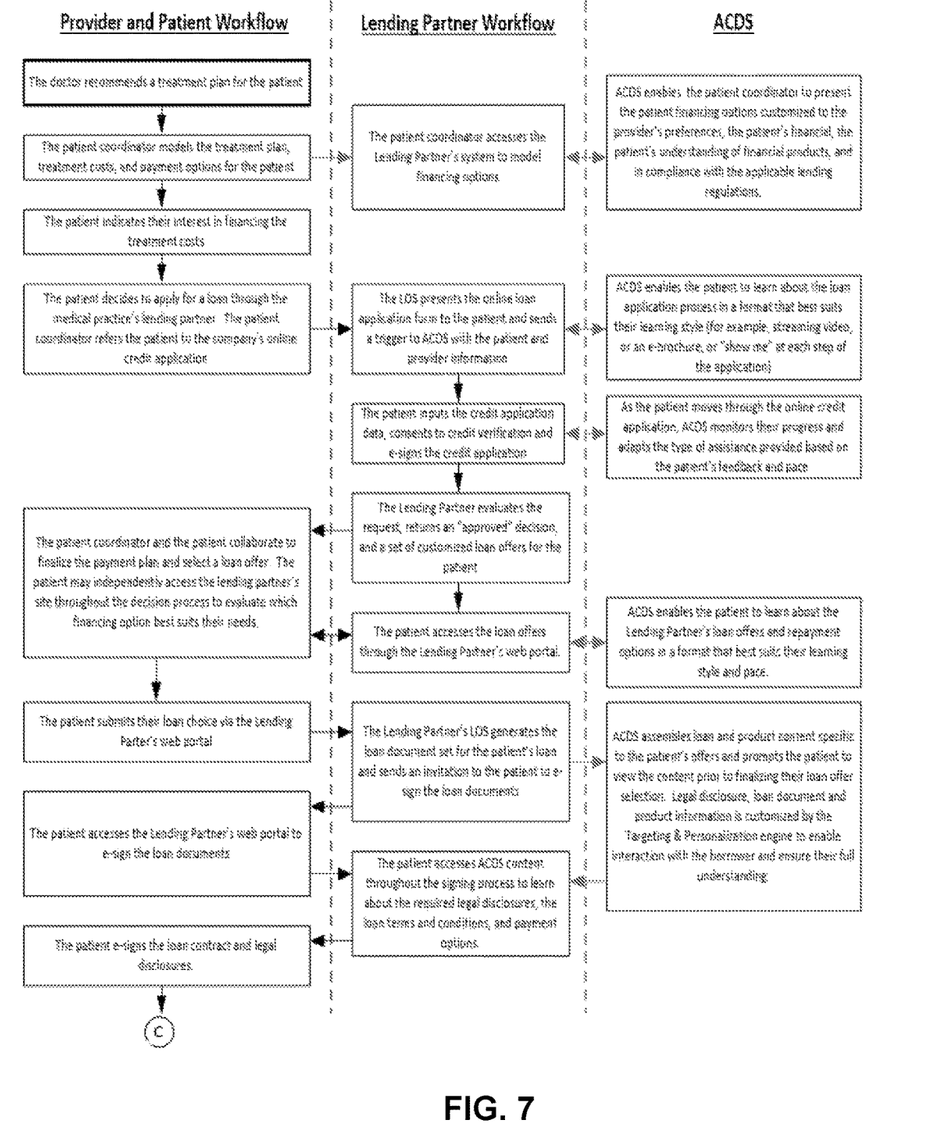
FIG. 7 illustrates an exemplary use case of adaptive content dissemination system in providing financial service.

FIG. 7 illustrates an exemplary use case of adaptive content dissemination system in providing financial service. FIG. 7 shows the procedure followed by provider and patient, lending partner and the adaptive content generation and dissemination system (ACGDS) and their dependencies. When the doctor recommends a treatment plan for the patient, the patient coordinator models the treatment plan, treatment costs, and payment options for the patient. Simultaneously, the patient coordinator accesses the lending partner's system to model financing options and the adaptive content dissemination system enables the patient coordinator to present the patient financing options customized to the provider's preferences, the patient's financial, the patient's understanding of financial products, and in compliance with the applicable lending regulations. After all the understandings regarding the financial products and the services, the patient indicates his interest in financing the treatment costs. The patient decides to apply for a loan through the medical practice's lending partner. The patient coordinator refers the patient to the company's online credit application. The Loan Origination System (LOS) presents the online loan application form to the patient and sends a trigger to adaptive content dissemination system with the patient and provider information. The adaptive content dissemination system enables the patient to learn about the loan application process in a format that best suits his learning style such as streaming video, or an e-brochure, or "show me" at each step of the application. The patient then inputs the credit application data, consents to credit verification and e-signs the credit application. As the patient moves through the online credit application, the adaptive content dissemination system monitors his progress and adapts the type of assistance provided based on the patient's feedback and pace. Simultaneously, the lending partner evaluates the request, returns an approved decision, and a set of customized loan offers for the patient. Then, the patient coordinator and the patient collaborate to finalize the payment plan and select a loan offer. The patient may independently access the lending partner's site throughout the decision process to evaluate which financing option best suits his needs. The patient accesses the loan offers through the lending partner's web portal. At the backend, the adaptive content dissemination system enables the patient to learn about the lending partner's loan offers and repayment options in a format that best suits his learning style and pace. The patient submits his loan choice via the lending partner's web portal. The lending partner's loan origination system generates the loan document set for the patient's loan and sends an invitation to the patient to e-sign the loan documents. The patient accesses the lending partner's web portal to e-sign the loan documents and the adaptive content dissemination system assembles loan and product content specific to the patient's offers and prompts the patient to view the content prior to finalizing his loan offer selection. Legal disclosures, loan documents and product information are customized by the targeting and personalization engine to enable interaction with the borrower and ensure their full understanding. The patient accesses content throughout the signing process to learn about the required legal disclosures, the loan terms and conditions, and payment options. The patient then e-signs the loan contract and legal disclosures.

The financial services company's online system offers the patient the option to set up an account to have his monthly loan payment automatically deducted. The financial services company displays the debit card, automated clearing house (ACH) and cash payment fields for input and sends a trigger to the adaptive content dissemination system for the payment options content. The patient can set up an automatic payment method for his monthly loan payment. The adaptive content dissemination system assembles the payment option content specific to the patient and prompts the patients to view the content to ensure that they understand how the payment option they selected will affect their personal banking accounts. Links to the adaptive content dissemination system product and financial information accessed by the patient during the loan origination process are embedded in the patient's "welcome message" to enable the patient to review the information during the life cycle of the loan. The financial services company assembles the loan documents payment set confirmation, and welcome information in electronic format and sends it to the patient's email address, along with a complete set of loan documents. As the patient's loan appears as ready to fund in the medical practice's reports in the financial services company system, the financial services company notifies the medical practice that the funds for the patient's treatment plan are available. The patient begins treatment and the medical practice notifies the financial services company to transfer the proceeds to the medical practice's bank account. The financial services company transfers the funds to the medical practice and begins amortizing the loan. Also, the financial services company transmits the loan record to the loan servicing system, initiates the automated clearing house (ACH) transactions to the medical practice's bank account, and sends a trigger to the adaptive content dissemination system for the loan amortization content. The adaptive content dissemination system sends a link to the patient's preferred communication method inviting them to view welcome content, explanation of any payment, maturity date changes, reminder of payment method, and how to contact the financial services customer support services. The targeting and personalization engine enables interaction and full understanding.

The methods and processes described herein may have fewer or additional steps or states and the steps or states may be performed in a different order. Not all the steps or states need to be reached. The methods and processes described herein may be embodied in, and fully or partially automated via, software code modules executed by one or more general purpose computers. The code modules may be stored in any type of computer-readable medium or other computer storage device. Some or all of the methods may alternatively be embodied in whole or in part in specialized computer hardware. The systems described herein may optionally include displays, user input devices (e.g., touchscreen, keyboard, mouse, voice recognition, etc.), network interfaces, etc.

The results of the disclosed methods may be stored in any type of computer data repository, such as relational databases and flat file systems that use volatile and/or non-volatile memory (e.g., magnetic disk storage, optical storage, EEPROM and/or solid state RAM).

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can", "may", "might", "e.g.", and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising", "including", "having", and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z" and "one or more of X, Y, Z" unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to be present.

While the phrase "click" may be used with respect to a user selecting a control, menu selection, or the like, other user inputs may be used, such as voice commands, text entry, gestures, etc. User inputs may, by way of example, be provided via an interface, such as via text fields, wherein a user enters text, and/or via a menu selection (e.g., a drop down menu, a list or other arrangement via which the user can check via a check box or otherwise make a selection or selections, a group of individually selectable icons, etc.). When the user provides an input or activates a control, a corresponding computing system may perform the corresponding operation. Some or all of the data, inputs and instructions provided by a user may optionally be stored in a system data store (e.g., a database), from which the system may access and retrieve such data, inputs, and instructions. The notifications and user interfaces described herein may be provided via a Web page, a dedicated or non-dedicated phone application, computer application, a short messaging service message (e.g., SMS, MMS, etc.), instant messaging, email, push notification, audibly, and/or otherwise.

The user terminals described herein may be in the form of a mobile communication device (e.g., a cell phone), laptop, tablet computer, interactive television, game console, media streaming device, head-wearable display, virtual or augmented reality device, networked watch, etc. The user terminals may optionally include displays, user input devices (e.g., touchscreen, keyboard, mouse, voice recognition, etc.), network interfaces, etc.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others.

The invention claimed is:

1. A computer implemented method for providing adaptively generated content to a user, the method comprising:
communicating by a server of a service provider requesting to provide assistance to a user, when the user opted for a service of the service provider using a user device over the Internet;
collecting by the server one or more of user information by utilizing data mining and extraction of hidden predictive data from a plurality of database for creating a profile of the user using machine learning;
applying a predictive model to search for similar profiles of other users matching with the profile of the user and determining the type of content objects or learning techniques to be provided for display on the user device;
processing by the server, rules associated with the profile of the user and generating a personalized presentation layer and communicating it to the user device while reducing the amount of critical thinking required to make a selection;
wherein the predictive model records deviation of the user from the content objects or learning techniques presented by the predictive model and wherein when a deviation is recorded, the predictive model further analyzes the user to identify patterns of new similar users' profiles and adjusts the rules associated with the profile and the personalized presentation layer accordingly.

2. The method of claim 1, wherein the one or more of user information is collected from a group consisting of form filled data, social network databases, insurance databases, credit service databases, government databases, the device identification parameters, human computer interaction types, different time durations associated with the different stages of the process and geolocation and GPS information.

3. The method of claim 1, wherein the type of content objects is a content for instruction, or training, or knowledge transfer, or on-demand help.

4. The method of claim 1, wherein the learning techniques can be in form of graphics, a video, an audio, and/or interactive sessions to enable the user to efficiently and rapidly consume and comprehend complex concepts and contractual transactions.

5. The method of claim 1, wherein predictive model utilizes machine learning algorithm for creating the user profile, and determining the content objects/learning technique.

6. A content server for generating adaptive content and presenting it to a user, comprising:
a database to store profiles of a plurality of users;
a processor configured to establish communication with a service provider that requests to provide assistance to a user, when the user opted for a service of the service provider using a user device over the Internet;
a personalization engine configured to collect information of the user from a plurality of resources and creating a user profile;
a rules engine having a set of programmed instructions configured to determine the applicability of a rule for the user profile;
a targeting engine configured to search similar profiles matching with the user profile in the database and applying a set of rules in the rules engine to determine the type of content objects or learning techniques to be provided for display to the user;
a presentation manager configured to present the determined content objects or learning techniques to the user;
wherein the targeting engine is configured to update similar profiles information upon deviation of the user from the content objects or learning techniques presented by a predictive model and to identify patterns of new similar users' profiles and adjusts the rules associated with the profile and the personalized presentation layer accordingly.

7. The server of claim 6, wherein the platform can be a web browser, or a mobile application, or a gaming console, or a virtual reality headset.

8. The server of claim 6, wherein the rules engine is triggered by an action of the user which can be one or more of e-commerce activity, or an application or a lead generation.

9. The server of claim 6, wherein the targeting engine and the personalization engine utilizes predictive model for refining the user profile and searching for similar profiles of other users in the database.

10. The server of claim 6, wherein the plurality of resources that can be used to collect user information are selected from the group consisting of filled-forms of the user, social network databases, insurance databases, credit service databases, government databases, the device identification parameters, human computer interaction types, different time durations associated with the different stages of the process and geolocation and GPS information.

11. The server of claim 6, wherein the learning techniques can be in form of graphics, video, audio, and/or interactive sessions to enable the user to efficiently and rapidly consume and comprehend complex concepts and contractual transactions.

12. The server of claim 6, wherein the type of content objects are one or more of content for instruction, or training, or knowledge transfer, or on-demand help.

* * * * *